US011156337B1

(12) United States Patent
Conway (10) Patent No.: US 11,156,337 B1
(45) Date of Patent: Oct. 26, 2021

(54) HEADLAMP ASSEMBLY HAVING A DUAL FILAMENT BULB WITH AN AMBER LENS AND COVER LENS TO SPREAD LIGHT TO PROVIDE FORWARD AND SIDE FACING TURN SIGNALS AND SIDE MARKERS

(71) Applicant: PACCAR Inc, Bellevue, WA (US)

(72) Inventor: Scott M. Conway, Flower Mound, TX (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 17/092,116

(22) Filed: Nov. 6, 2020

(51) Int. Cl.
*F21S 43/20* (2018.01)
*F21S 43/13* (2018.01)
*F21S 43/50* (2018.01)
*B60Q 1/32* (2006.01)
*B60Q 1/34* (2006.01)
*B60Q 1/28* (2006.01)
*B60Q 1/04* (2006.01)

(52) U.S. Cl.
CPC .............. *F21S 43/255* (2018.01); *B60Q 1/04* (2013.01); *B60Q 1/28* (2013.01); *B60Q 1/32* (2013.01); *B60Q 1/34* (2013.01); *F21S 43/13* (2018.01); *F21S 43/50* (2018.01)

(58) Field of Classification Search
CPC .......... F21S 43/20; F21S 43/26; F21S 43/255; B60Q 1/34
See application file for complete search history.

(56) References Cited

U.S. PATENT DOCUMENTS 3,603,928 A * 9/1971 Speedy ................... F21S 43/40
362/506
2021/0151867 A1* 5/2021 Prabhakar ................ H01Q 1/36

\* cited by examiner

*Primary Examiner* — Robert J May
(74) *Attorney, Agent, or Firm* — Seed Intellectual Property Law Group LLP (57) ABSTRACT

Optical features of a light bulb, a bezel, an amber lens, and a cover lens of a headlamp assembly combine such that the headlamp assembly can meet all requirements for forward-facing turn signal, side-facing turn signal, side marker light, and side reflex refractor functionality with a single light bulb including two filaments.

20 Claims, 9 Drawing Sheets

HEADLAMP ASSEMBLY HAVING A DUAL FILAMENT BULB WITH AN AMBER LENS AND COVER LENS TO SPREAD LIGHT TO PROVIDE FORWARD AND SIDE FACING TURN SIGNALS AND SIDE MARKERS

BACKGROUND

Technical Field

The present disclosure relates generally to headlamp assemblies for motor vehicles such as medium-duty or heavy-duty trucks.

Description of the Related Art

Federal Motor Vehicle Safety Standard 108 (FMVSS 108) relates to lighting, signaling, and reflective devices for medium-duty and heavy-duty trucks. Lighting requirements include a "side marker light" requirement. FMVSS 108 requires that a side marker light be visible 45° fore, 45° aft, 10° upward, and 10° downward. Signaling requirements include both "forward-facing turn signal" and "side-facing turn signal" requirements. FMVSS 108 requires that a forward-facing turn signal be visible 45° inboard and 85° outboard and provide 75 sq. cm of projected illuminated area. FMVSS 108 also requires that a side-facing turn signal be visible 30° fore, 70° aft, 15° upward, and 15° downward. Reflective requirements include a "side reflex refractor" requirement. FMVSS 108 requires that a side reflex refractor be functional at an angle of 20° aft. Typically, such requirements are fulfilled by providing a plurality of lighting, signaling, and/or reflective assemblies and a plurality of lightbulbs.

Headlamp assemblies typically include a bezel, which may include a plurality of distinct sockets each for receiving a respective light bulb, where each of the light bulbs facilitates compliance with one or more requirements of FMVSS 108. Headlamp assemblies also typically include an amber lens to satisfy lighting color requirements of FMVSS 108. Headlamp assemblies also typically include a cover lens that extends in front of and over the bezel, light bulbs mounted therein, and the amber lens.

BRIEF SUMMARY

The present disclosure relates generally to headlamp assemblies for use in medium-duty and/or heavy-duty trucks. In the headlamp assemblies of the present disclosure, exactly one single lightbulb (no more than one individual light bulb and no less than one individual light bulb) with exactly two filaments (no more than two individual filaments and no less than two individual filaments) is mounted within a single socket of a bezel and combined with a plurality of optical features formed on surfaces of the bezel, an amber lens, and a cover lens to provide more functionality than previously provided with a single light bulb. This provides advantages in terms of cost-savings, including up-front costs as well as lifetime inspection and/or maintenance costs, because only a single light bulb is used in place of multiple light bulbs.

A headlamp assembly may be summarized as comprising: an incandescent light bulb including two filaments; a bezel; an amber lens; and a cover lens; wherein the light bulb, the bezel, the amber lens, and the cover lens are configured to provide forward-facing turn signal, side-facing turn signal, side marker light, and side reflex refractor functionality. The headlamp assembly may be mounted in a medium-duty truck. The incandescent light bulb may be a halogen light bulb.

The light bulb, the bezel, the amber lens, and the cover lens may be configured such that the headlamp assembly provides forward-facing turn signal, side-facing turn signal, side marker light, and side reflex refractor functionality in conformance with all requirements specified in Federal Motor Vehicle Safety Standard 108. The light bulb, the bezel, the amber lens, and the cover lens may be configured such that the headlamp assembly provides a forward-facing turn signal that is visible 45° inboard and 85° outboard and that provides 75 square centimeters of projected illuminated area. The light bulb, the bezel, the amber lens, and the cover lens may be configured such that the headlamp assembly provides a side-facing turn signal that is visible 70° aft. The light bulb, the bezel, the amber lens, and the cover lens may be configured such that the headlamp assembly provides a side marker light that is visible 45° fore and 45° aft. The light bulb, the bezel, the amber lens, and the cover lens may be configured such that the headlamp assembly provides a side reflex refractor that is functional at an angle of 20° aft.

A headlamp assembly may be summarized as comprising: an incandescent light bulb including two filaments, the two filaments including a minor filament and a major filament that is brighter than the minor filament; an amber lens including first optical features that spread a first portion of light from the incandescent light bulb left-to-right, second optical features that spread a second portion of light from the incandescent light bulb front-to-back, third optical features that redirect a third portion of light from the incandescent light bulb vertically, and a side reflex refractor; and a cover lens including fourth optical features that spread a fourth portion of light from the incandescent light bulb front-to-back and fifth optical features that redirect a fifth portion of light from the incandescent light bulb vertically.

The first optical features of the amber lens may include a plurality of distinct curved optical surfaces formed in a rear surface of the amber lens, wherein each of the curved optical surfaces has a convex shape when viewed from behind the amber lens. The second optical features of the amber lens may include a plurality of substantially vertical flutes, wherein each of the flutes includes a substantially vertically-oriented curved optical surface having a convex shape when viewed from behind the amber lens. The third optical features of the amber lens may include a plurality of generally planar optical surfaces formed in a rear surface of the amber lens. The fourth optical features of the cover lens may include a plurality of optical surfaces formed in a rear surface of the cover lens, wherein each of the optical surfaces has a generally convex shape when viewed from behind the cover lens. The fifth optical features of the cover lens may include a plurality of optical surfaces formed in a rear surface of the cover lens, wherein each of the optical surfaces has a generally planar shape when viewed from behind the cover lens. The headlamp assembly may further comprise a bezel, wherein the bezel includes a plurality of reflective convex curved surfaces that are contoured to focus light from the major filament forward. The bezel may further include a cutaway portion that interrupts a generally spherical arrangement of the plurality of reflective convex curved surfaces.

A method of operating a headlamp assembly may be summarized as comprising: illuminating a major filament of an incandescent light bulb such that a first portion of light generated by the major filament propagates through and is spread inboard and outboard by interaction with first optical surfaces of an amber lens to provide forward-facing turn signal functionality and such that a second portion of light generated by the major filament propagates through and is spread fore and aft by interaction with second optical surfaces of the amber lens and propagates through and is redirected by interaction with optical surfaces of a cover lens to provide side-facing turn signal functionality; and illuminating a minor filament of the incandescent light bulb such that a first portion of light generated by the minor filament propagates through and is spread fore and aft by interaction with the second optical surfaces of the amber lens and does not propagate through and is not redirected by interaction with the optical surfaces of the cover lens, and such that a second portion of light generated by the minor filament propagates through and is distributed vertically by interaction with third optical surfaces of the amber lens and does not propagate through and is not redirected by interaction with the optical surfaces of the cover lens, to provide side marker light functionality.

A third portion of light generated by the minor filament may propagate through and be spread inboard and outboard by interaction with the first optical surfaces of the amber lens. The first portion of light generated by the major filament may be reflected by a bezel of the headlamp assembly prior to propagating through the first optical surfaces of the amber lens. The second portion of light generated by the major filament may propagate through a cutaway portion of a bezel of the headlamp assembly prior to propagating through the second optical surfaces of the amber lens, the first portion of light generated by the minor filament may propagate through the cutaway portion of the bezel prior to propagating through the second optical surfaces of the amber lens, and the second portion of light generated by the minor filament may propagate through the cutaway portion of the bezel prior to propagating through the third optical surfaces of the amber lens.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

Figure 1:
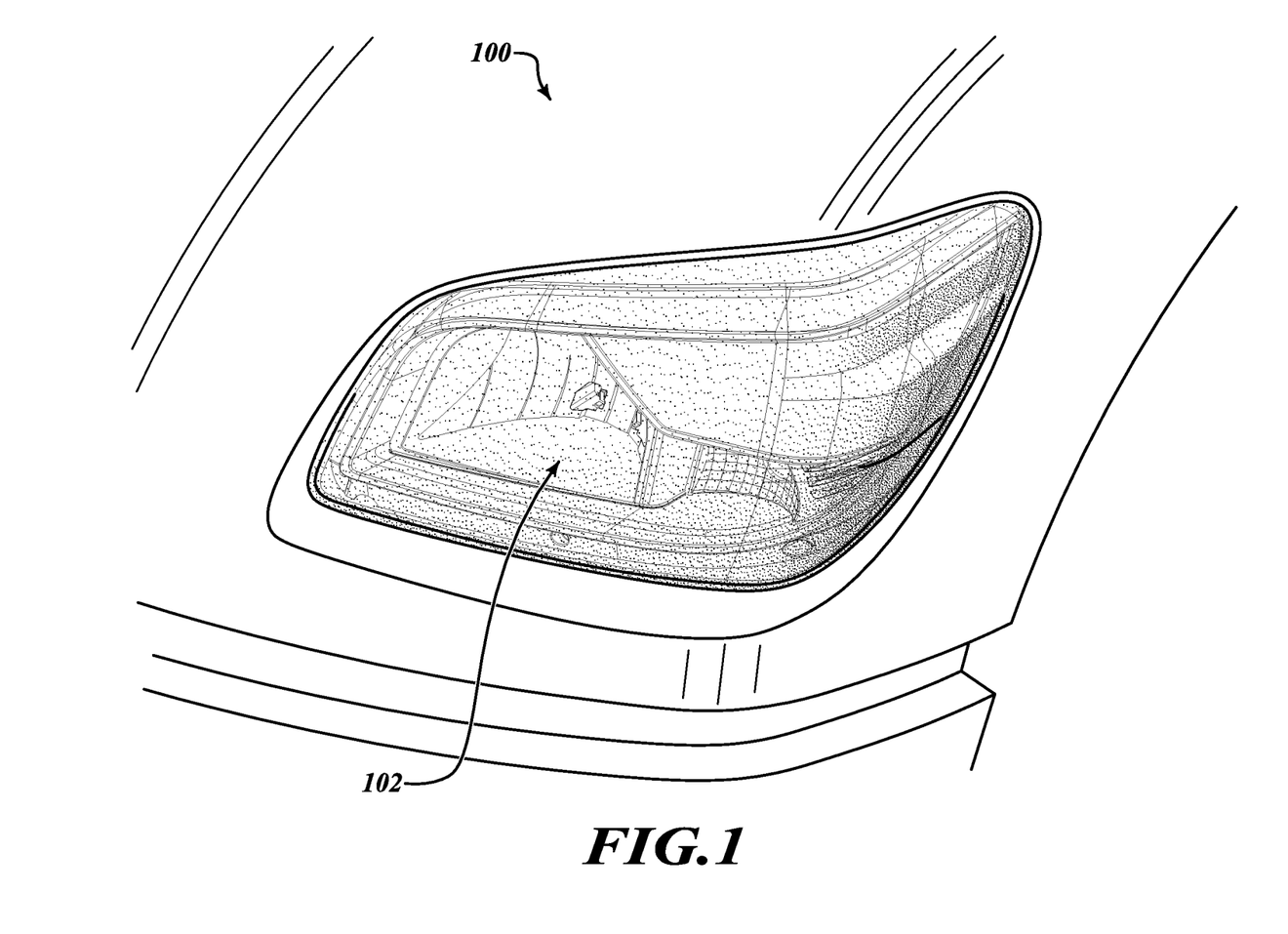
FIG. 1 illustrates a driver-side or left-hand side headlamp assembly installed in a truck.

FIG. 1 illustrates a driver-side or left-hand side headlamp assembly 102 installed in a truck 100. As used herein, the phrases "left-hand side" and "left" generally refer to the side of a truck that is on the left from the perspective of an occupant who is facing forward inside the truck, which is generally where a driver's seat and controls are located in a vehicle manufactured for the American market or any other market that drives on the right side of the roadway. Similarly, as used herein, the phrases "right-hand side" and "right" generally refer to the side of a truck that is on the right from the perspective of an occupant who is facing forward inside the truck, which is generally where a passenger's seat is located in a vehicle manufactured for the American market or any other market that drives on the right side of the roadway. The present disclosure relates specifically to a driver-side or left-hand side headlamp assembly 102. A passenger-side or right-hand side headlamp assembly may be a mirror image of the driver-side or left-hand side headlamp assembly 102.

When used herein in reference to structural features of the headlamp assembly 102, the phrases "vertical," "vertically," "horizontal," and "horizontally" are approximations rather than exact descriptors of orientations, and generally refer to orientations as seen by an observer at a point in space at a distance from the features rather than actual physical orientations. For example, a line that is curved or bowed in space may be vertical or horizontal as viewed by an observer at a certain point in space at a distance from the line. As used herein, the phrases "front" and "back" and other similar terminology take their common meaning, such that a cabin and an engine of a truck is generally at the front of the truck and opposite the rear of the truck. As used herein, the phrases "up," "down," "above," and "below," and other similar terminology, take their common meaning, that is, such that gravity pulls objects down.

As illustrated in FIG. 1, the headlamp assembly 102 may be mounted and positioned within a hood of the truck 100, such as at a lower, left-side, and front corner thereof, above a bumper of the truck 100, and in front of a front, left wheel of the truck 100. Thus, as shown in FIG. 1, the headlamp assembly 102 may face both directly forward and directly leftward from the hood of the truck 100 and may be visible from both directly in front of the truck 100 and directly to the left side of the truck.

Figure 2:
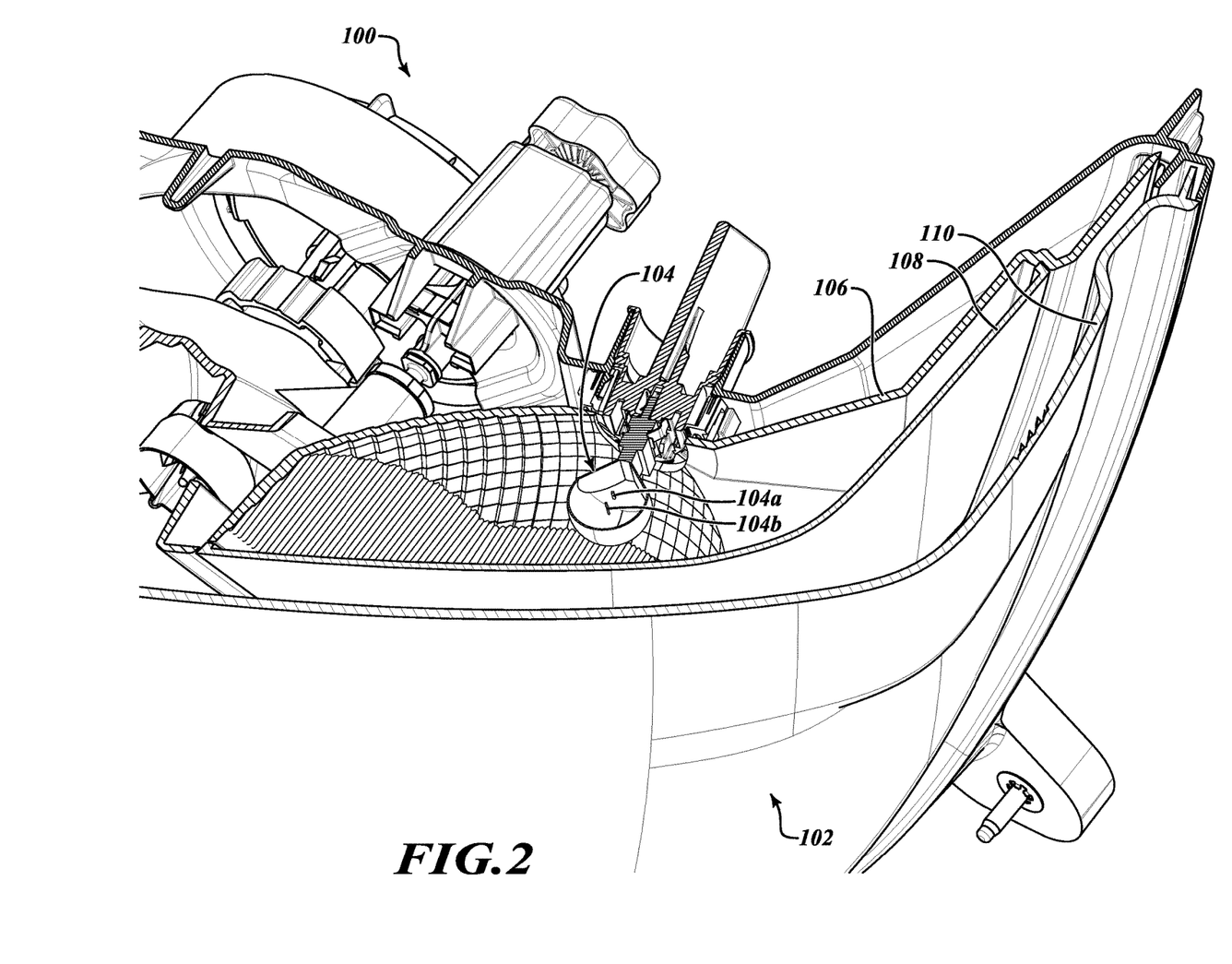
FIG. 2 illustrates a cross-sectional view of the headlamp assembly of FIG. 1 and of other portions of the truck of FIG. 1.

FIG. 2 illustrates a perspective, cross-sectional view of the headlamp assembly 102 and of other portions of the truck 100. As illustrated in FIG. 2, the headlamp assembly 102 includes a lightbulb 104, which includes a first, minor filament 104a, which may be configured in terms of brightness, color, etc., for compliance with regulations regarding side marker lights, and a second, major filament 104b, which may be configured in terms of brightness, color, etc., for compliance with regulations regarding forward-facing turn signals and/or side-facing turn signals and which may be brighter than the minor filament 104a, as well as a bezel 106, an amber lens 108, and a cover lens 110.

As illustrated in FIG. 2, the light bulb 104 is not directly coupled to the bezel 106, the amber lens 108, or the cover lens 110. Rather, the lightbulb 104 is directly coupled to or mounted on other component(s) of the truck 100 behind the bezel 106, and the light bulb 104 extends through an opening or an aperture in the bezel 106, such that a main body of the light bulb 104, including the bulb portion, minor filament 104a, and major filament 104b thereof, are located in front of and to the left of the bezel 106 and behind and to the right of the amber lens 108 and the cover lens 110. The lightbulb 104 is mechanically, electrically, and communicatively coupled to other components of the truck 100 in this manner, such that the lightbulb 104 and its filaments 104a, 104b are located in the correct position and orientation, such that the lightbulb 104 is powered, such as by a battery of the truck 100, and such that a driver of the truck 100 can control operation of the lightbulb 104, such as by activating a turn signal or turn indicator using dials, knobs, levers, buttons, or other control devices in the cabin or cockpit of the truck 100.

As further illustrated in FIG. 2, the bezel 106 is directly coupled to or mounted on other component(s) of the truck 100 behind the bezel 106. As seen in the cross-sectional view of FIG. 2, the bezel 106 extends from a rear-most and left-most portion thereof, generally forward and rightward to a front-most and right-most portion thereof, and includes various curvatures, angles, and other features as described in greater detail elsewhere herein, which include a recess, concavity, or socket, which is sunken backwards with respect to a front, forward-facing surface of the bezel 106, and which is configured to receive the light bulb 104.

The amber lens 108 also extends from a rear-most and left-most portion thereof, which is engaged with and directly coupled to a complementary portion of the bezel 106, generally forward and rightward to a front-most and right-most portion thereof, which is also engaged with and directly coupled to a complementary portion of the bezel 106, and includes various curvatures, angles, and other features as described in greater detail elsewhere herein. The amber lens 108 or a substantial portion thereof has an overall or substantially convex shape when viewed from the front. As illustrated in the cross-sectional view of FIG. 2, the amber lens 108 extends from its rear-most and left-most portion initially primarily forward to a location in front of the bezel 106, and then primarily rightward to its front-most and right-most portion, such that a void or open space is formed between the bezel 106 and the amber lens 108, that is, in front of and to the left of the bezel 106 and behind and to the right of the amber lens 108, of size sufficient to house the portion of the light bulb 104 extending through and sitting in front of the bezel 106, and such that the amber lens 108 covers and extends across the socket formed in the bezel 106 within which the light bulb 104 is situated.

The cover lens 110 also extends from a rear-most and left-most portion thereof, which is coupled to or mounted on other component(s) of the truck 100 behind the bezel 106, generally forward and rightward to a front-most and right-most portion thereof, which is also engaged with and coupled to or mounted on other component(s) of the truck 100, and includes various curvatures, angles, and other features as described in greater detail elsewhere herein. The cover lens 110 or a substantial portion thereof has an overall or substantially convex shape when viewed from the front. As illustrated in FIG. 2, the cover lens 110 extends from its rear-most and left-most portion initially primarily forward, and then primarily rightward to its front-most and right-most portion, such that a void or open space is formed between the amber lens 108 and the cover lens 110, that is, in front of and to the left of the amber lens 108 and behind and to the right of the cover lens 110.

Figure 3:
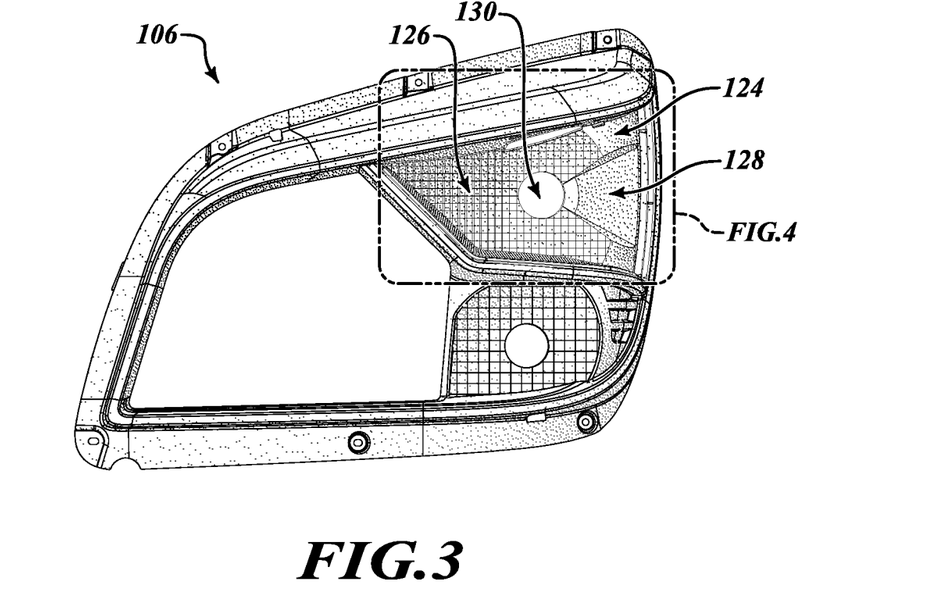
FIG. 3 illustrates a front view of a bezel of the headlamp assembly of FIG. 1.

FIG. 3 illustrates a front view of the bezel 106 of the headlamp assembly 102. As illustrated in FIG. 3, the bezel 106 may include a plurality of sockets, each for receiving one or more respective light bulbs and for performing one or more respective lighting functions of the truck 100. For example, one of the sockets of the bezel 106 may house a light bulb configured to provide high-beam lighting. As another example, another one of the sockets of the bezel 106 may house a light bulb configured to provide low-beam lighting. The bezel 106 of the headlamp assembly 102 includes an uppermost and left-most socket 124 configured to provide side reflex refractor functionality of the truck 100 and to receive and house the lightbulb 104 to facilitate operation of the lightbulb 104 to provide forward-facing and side-facing turn signal and side marker functionality. When the headlamp assembly 102 is fully assembled, the amber lens 108 covers only the socket 124 and the cover lens 100 covers plural sockets, such as all sockets, of the bezel 106.

As further illustrated in FIG. 3, the bezel 106 includes an opening or aperture 130 configured to receive the light bulb 104, such that the light bulb 104 can extend through the bezel 106 such that its filaments 104*a* and 104*b* are positioned at desired, specified locations in front of the bezel 106 and generally at the center of the socket 124. As also illustrated in FIG. 3, a generally spherically-shaped portion of the socket 124 surrounding the aperture 130 includes a plurality of (e.g., several hundred) optically reflective curved surfaces or "pillow reflectors" 126, which are positioned, oriented, and/or contoured to focus light from the minor filament 104*a* and/or the major filament 104*b* forward. For example, the light bulb 104 may be an incandescent light bulb such as a halogen light bulb 104, which generally produces a spherical distribution of light. Thus, the pillow reflectors 126 may collect or gather light emitted rearward and/or sideways from the minor filament and/or the major filament 104*b* of the lightbulb 104 and reflect or otherwise redirect it so that it propagates forward from the headlamp assembly 102, thereby increasing the overall intensity of the light generated by the minor filament 104*a* and/or major filament 104*b* when the headlamp assembly 102 is viewed from in front of the truck 100. The pillow reflectors 126 may be positioned and oriented so they are focused on the minor filament 104*a*, on the major filament 104*b*, or on an intermediate location directly between the minor filament 104*a* and the major filament 104*b*.

The pillow reflectors 126 and any other portions of the bezel 106, or the entirety of the exterior-facing surfaces of the bezel 106, may be mirror- or chrome-finished, to improve reflectance thereof. These features facilitate compliance with minimum intensity requirements using a less expensive light bulb. Each of the pillow reflectors 126 has a convex curved surface when viewed from the front, such as to increase or optimize a spread angle of the light reflected by the pillow reflectors 126 and propagating out the front of the headlamp assembly 102. In some embodiments, the plurality of pillow reflectors 126 are arranged in rows and columns. As used herein, the terms "rows" and "columns" carry their ordinary meaning, such that, when the features are viewed straight-on by an upright observer, "rows" are arranged horizontally or substantially horizontally and "columns" are arranged vertically or substantially vertically. For example, when the bezel 106 is viewed from the front, the plurality of pillow reflectors 126 includes a plurality of horizontal rows of pillow reflectors 126 and a plurality of vertical rows of pillow reflectors 126. In specific embodiments, the plurality of pillow reflectors 126 includes at least 15, at least 20, at least 25, at least 30, or at least 35 columns of pillow reflectors 126 and at least 10, at least 15, at least 20, or at least 25 rows of pillow reflectors 126.

As also illustrated in FIG. 3, the socket 124 includes a cutout or cutaway portion 128 formed in the otherwise generally spherically-shaped portion of the socket 124 that includes the pillow reflectors 126, such as at a left side thereof, where the cutaway portion 128 interrupts the spherical arrangement of the pillow reflectors 126, and allows light from both the minor filament 104*a* and the major filament 104*b* of the lightbulb 104 to extend further leftward and further rearward and/or further upward and further downward than would otherwise be the case. As illustrated in FIG. 3, the cutaway portion 128 may extend up to 45 degrees upward and/or 45 degrees downward from a horizontal axis.

Figure 4:
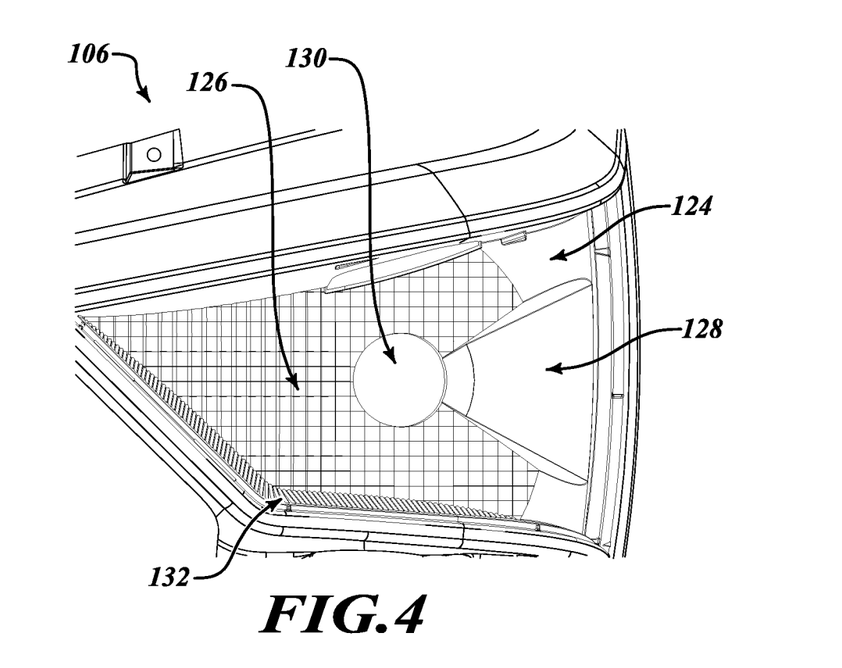
FIG. 4 illustrates an enlarged front view of a portion of the bezel of the headlamp assembly of FIG. 1, as indicated in FIG. 3.

FIG. 4 illustrates an enlarged front view of a portion of the bezel 106 of the headlamp assembly 102. As illustrated in FIG. 4, two generally planar surfaces of the socket 124, located below, in front of, and to the right of the pillow reflectors 126, include a plurality of (e.g., several dozen) optically absorbent features (or features of low reflectivity) or flutes 132, which are positioned, oriented, and/or contoured to avoid focusing light from the minor filament 104*a* and/or major filament 104*b* forward. For example, the flutes 132 includes a plurality of raised ridges alternating with sunken grooves, where the ridges and grooves each extend generally forward and rearward or front-to-back, and parallel to one another. The flutes 132 may not be mirror- or chrome-finished, to reduce their reflectance. These features can reduce glare produced by the headlamp assembly 102, thereby decreasing the overall intensity of the light generated by the minor filament 104*a* and/or major filament 104*b* when viewed from in front of the truck 100, to facilitate compliance with maximum intensity or glare requirements.

Figure 5:
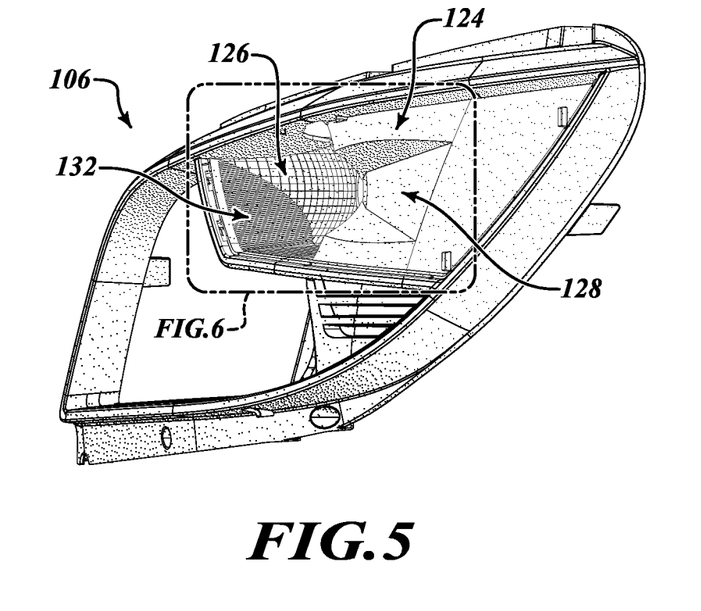
FIG. 5 illustrates a side view of the bezel of the headlamp assembly of FIG. 1.
Figure 6:
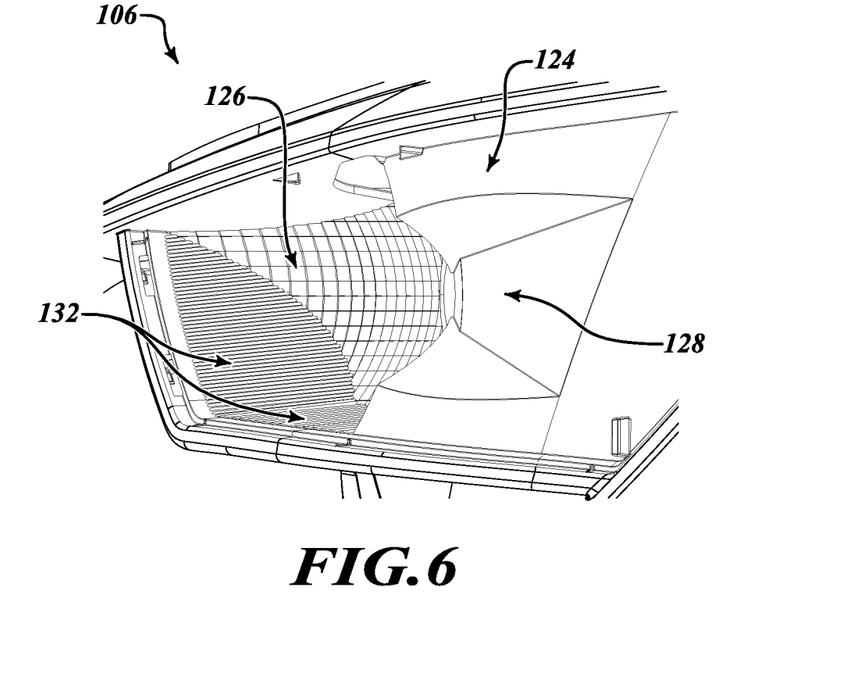
FIG. 6 illustrates an enlarged side view of a portion of the bezel of the headlamp assembly of FIG. 1, as indicated in FIG. 5.
Figure 7:
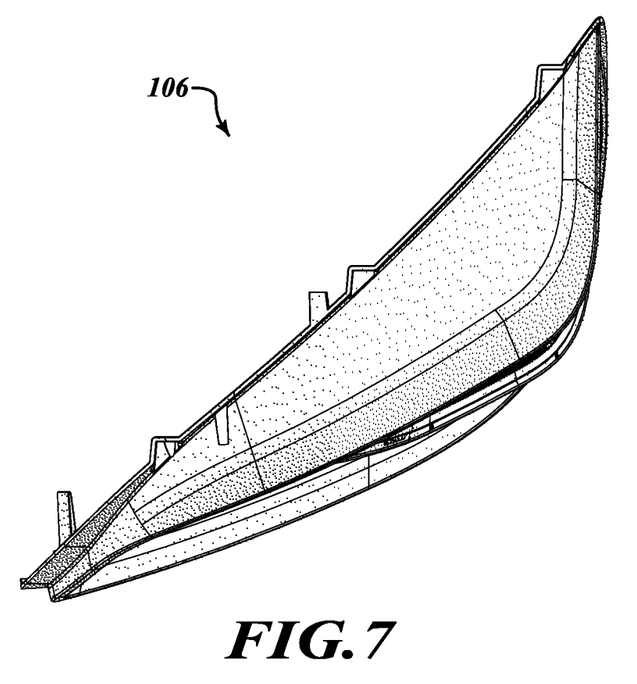
FIG. 7 illustrates a top view of the bezel of the headlamp assembly of FIG. 1.

FIG. 5 illustrates a side view of the bezel 106 of the headlamp assembly 102 and FIG. 6 illustrates an enlarged side view of a portion of the bezel 106 of the headlamp assembly 102. FIGS. 5 and 6 illustrate additional features of the bezel 106. For example, as illustrated in FIGS. 5 and 6, the cutaway portion 128 may extend up to 45 degrees rearward or aft with respect to a left-to-right or side-to-side axis of the truck 100. FIG. 7 illustrates a top view of the bezel 106 of the headlamp assembly 102.

Figure 8:
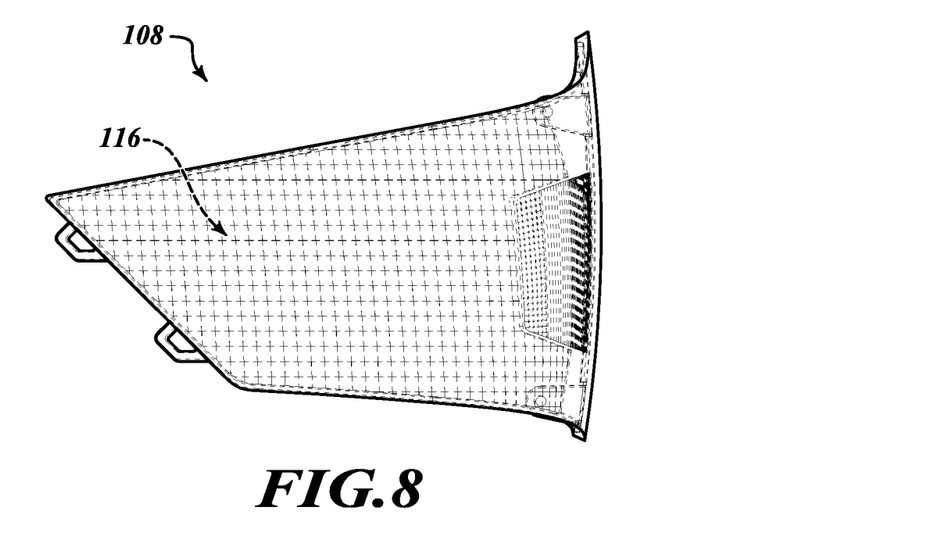
FIG. 8 illustrates a front view of an amber lens of the headlamp assembly of FIG. 1.

FIG. 8 illustrates a front view of the amber lens 108 of the headlamp assembly 102. The amber lens 108 is made of an optically-transparent material having an amber color, with specific colors, hues, and/or tints selected for compliance with relevant regulations. As illustrated in FIG. 8, the amber lens 108 includes a plurality of (e.g., several hundred) distinct curved optical surfaces 116 formed in a rear or inner surface thereof, which collectively extend across substantially the entire profile of the amber lens 108 when the amber lens 108 is viewed from the front. Each of the curved optical surfaces 116 has a convex shape when viewed from behind the amber lens 108, that is, when looking directly at the rear or inner surface of the amber lens 108 in which the curved optical surfaces 116 are formed. Each of the curved optical surfaces 116 is positioned, oriented, contoured, and otherwise configured such that refraction of light from the minor filament 104*a* and/or major filament 104*b* entering the rear, inner surface of the amber lens 108 through the curved optical surfaces 116 and exiting a front, outer surface of the amber lens 108 is distributed left-to-right or side-to-side with respect to the truck 100 to meet all inboard and outboard requirements for forward-facing turn signals specified in FMVSS 108.

Figure 9:
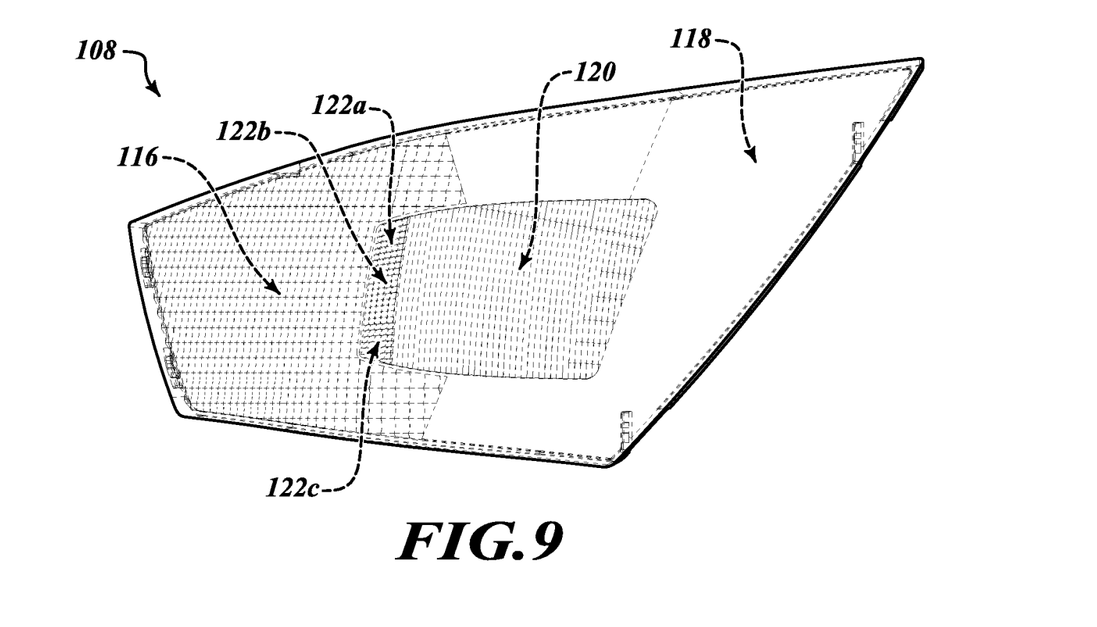
FIG. 9 illustrates a side view of the amber lens of the headlamp assembly of FIG. 1.

FIG. 9 illustrates a side view of the amber lens 108 of the headlamp assembly 102. As illustrated in FIG. 9, the amber lens 108 includes a side portion thereof that extends primarily front-to-back or forward and rearward, which includes a side reflex refractor 118, which is illustrated as a clear portion of the amber lens 108 in FIG. 9. The side reflex refractor 118 of the amber lens 108 includes a plurality of pyramidal-shaped reflex refractors on the rear or inner surface of the amber lens 108. The side reflex refractor 118 and its individual reflex refractors are configured to meet all requirements for side reflex refractors specified in FMVSS 108.

As also illustrated in FIG. 9, the amber lens 108 includes a plurality of vertical or substantially vertical flutes 120 at a central portion thereof such that the vertical flutes 120 are spaced apart from top and bottom edges of the amber lens 108 and span from the side portion of the amber lens 108 to a location of a bend or curve in a middle or central portion of the amber lens 108 between the side portion thereof and a front portion thereof that extends primarily side-to-side or left-to-right. Thus, a rear-most and/or left-most portion of the plurality of vertical flutes 120 are bordered on top, on the left, and on the bottom by the side reflex refractor 118, and a front-most and/or right-most portion of the plurality of vertical flutes 120 are bordered on top and on bottom by the curved optical surfaces 116 and on the right by optical surfaces 122, as described further elsewhere herein. Each of the vertical flutes 120 includes a vertically- or substantially vertically-oriented curved optical surface having a convex shape when viewed from behind the amber lens 108, that is, when looking directly at the rear or inner surface of the amber lens 108 in which the vertical flutes 120 are formed. Each of the vertical flutes 120 is positioned, oriented, contoured, and otherwise configured such that refraction of light from the minor filament 104a entering the rear, inner surface of the amber lens 108 through the vertical flutes 120 and exiting a front, outer surface of the amber lens 108 is distributed forward (fore) and rearward (aft) or front-to-back with respect to the truck 100 to meet all fore/aft requirements for side marker lights specified in FMVSS 108. Light from the major filament 104b entering the rear, inner surface of the amber lens 108 through the vertical flutes 120 and exiting a front, outer surface of the amber lens 108 is also distributed by refraction fore and aft and is partially or entirely redirected by refraction toward additional optical features formed in the cover lens 110, as discussed further elsewhere herein.

As also illustrated in FIGS. 8 and 9, the amber lens 108 includes a plurality of generally planar optical surfaces 122a, 122b, and 122c (referred to collectively as optical surfaces 122) formed in a rear or inner surface thereof and at a central portion thereof such that the optical surfaces 122 are spaced apart from top and bottom edges of the amber lens 108 and span across the location of the bend or curve in the amber lens 108 between the side portion thereof and the front portion thereof. The optical surfaces 122 are bordered on the top, on the right, and on the bottom by the curved optical surfaces 116, and on the left by the vertical flutes 120. Each of the optical surfaces 122 has a generally planar shape, where the plane within which each of the planar surfaces sits is different than, and oblique to, the rear surface of the rest of, or of a main body of, the amber lens 108. In some cases, the planes within which the planar surfaces 122 sit are different than, and/or oblique to, one another.

Figure 10:
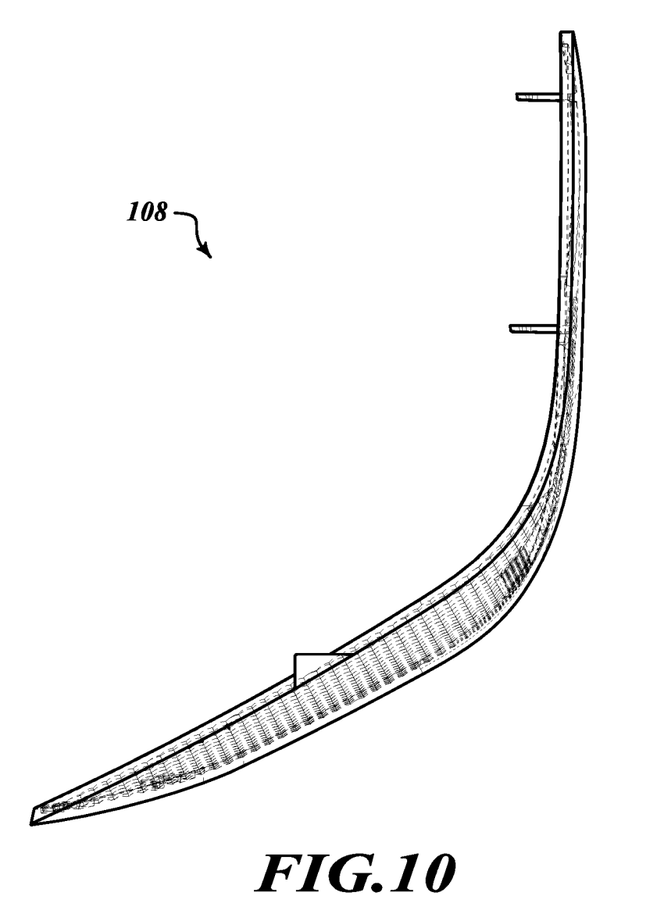
FIG. 10 illustrates a top view of the amber lens of the headlamp assembly of FIG. 1.

Each of the optical surfaces 122 is positioned, oriented, contoured, and otherwise configured such that refraction of light from the minor filament 104a entering the rear, inner surface of the amber lens 108 through the optical surfaces 122 and exiting a front, outer surface of the amber lens 108 is distributed and/or directed up-and-down with respect to the truck 100 to meet all vertical angle requirements for side marker lights specified in FMVSS 108. For example, light from the minor filament 104a entering the optical surfaces 122a, which are located above the optical surfaces 122b and the optical surfaces 122c, may be redirected by refraction either upward or downward, light from the minor filament 104a entering the optical surfaces 122b, which are located below the optical surfaces 122a and above the optical surfaces 122c, may be redirected by refraction directly forward from the front, outer surface of the amber lens 108, and light from the minor filament 104a entering the optical surfaces 122c, which are located below the optical surfaces 122a and the optical surfaces 122b, may be redirected by refraction either downward or upward (e.g., downward if light through the optical surfaces 122a is directed upward and upward if light through the optical surfaces 122a is directed downward). FIG. 10 illustrates a top view of the amber lens 108 of the headlamp assembly 102.

Figure 11:
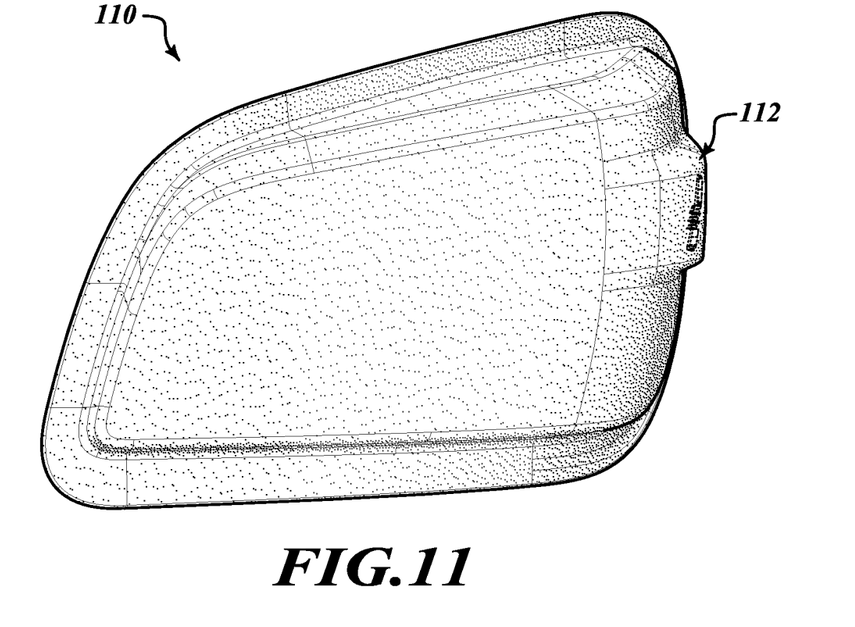
FIG. 11 illustrates a front view of a cover lens of the headlamp assembly of FIG. 1.
Figure 12:
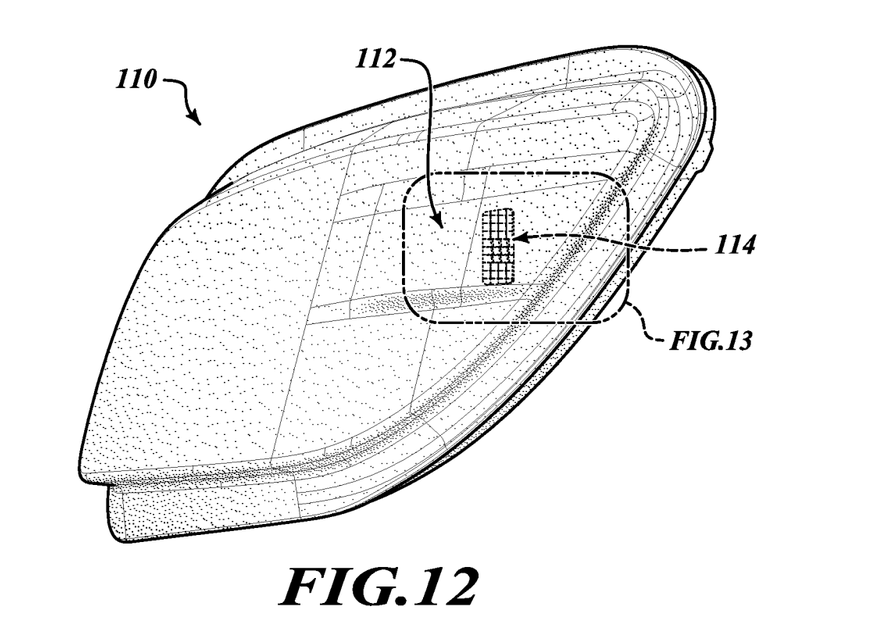
FIG. 12 illustrates a side view of the cover lens of the headlamp assembly of FIG. 1.

FIG. 11 illustrates a front view of the cover lens 110 of the headlamp assembly 102. As illustrated in FIG. 11, the cover lens 110 has a generally flat and/or smooth front portion, and a bulge or bulbous protrusion 112 at an upper, left-side portion thereof, which extends radially outward or leftward from the main body of the cover lens 110. The protrusion 112 is positioned to overlay the socket 124 of the bezel 106, and the flutes 120 and optical surfaces 122 of the amber lens 108, when the protrusion 112 is viewed straight on and toward the light bulb 104. The protrusion 112 may take the form of a relatively wide or thick ridge extending generally front-to-back or fore/aft along a left side surface of the cover lens 110. FIG. 12 illustrates a side view of the cover lens 110 of the headlamp assembly 102 and FIG. 13 illustrates an enlarged side view of a portion of the cover lens 110 of the headlamp assembly 102.

Figure 13:
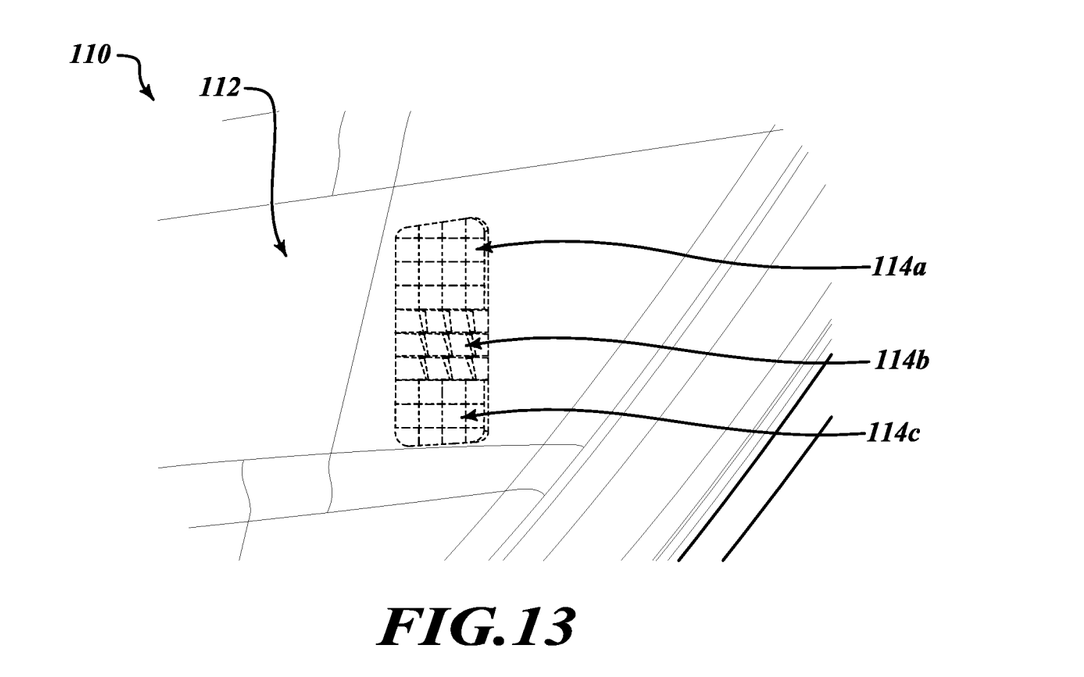
FIG. 13 illustrates an enlarged side view of a portion of the cover lens of the headlamp assembly of FIG. 1, as indicated in FIG. 12.

As illustrated in FIG. 13, the protrusion 112 of the cover lens 110 includes a plurality of optical surfaces 114a, 114b, and 114c (referred to collectively as optical surfaces 114 or a grid of pillows 114) formed in a rear or inner surface thereof and at a central portion thereof such that the optical surfaces 114 overlay the flutes 120 of the amber lens 108 when they are viewed straight on and toward the light bulb 104. The optical surfaces 114a are located above the optical surfaces 114b and the optical surfaces 114c and each of the optical surfaces 114a has a generally convex shape when viewed from behind the cover lens 110, that is, when looking directly at the rear or inner surface of the cover lens 110 in which the curved optical surfaces 114a are formed. The optical surfaces 114b are located below the optical surfaces 114a and above the optical surfaces 114c and each of the optical surfaces 114b has a generally planar shape, where the plane within which each of the planar surfaces sits is different than, and oblique to, the rear surface of the rest of, or of a main body of, the protrusion 112 of the cover lens 110. In some cases, the planes within which the planar optical surfaces 114b sit are different than, and/or oblique to, one another. The optical surfaces 114c are located below the optical surfaces 114a and the optical surfaces 114b and each of the optical surfaces 114c has a generally convex shape when viewed from behind the cover lens 110, that is, when looking directly at the rear or inner surface of the cover lens 110 in which the curved optical surfaces 114c are formed.

Figure 14:
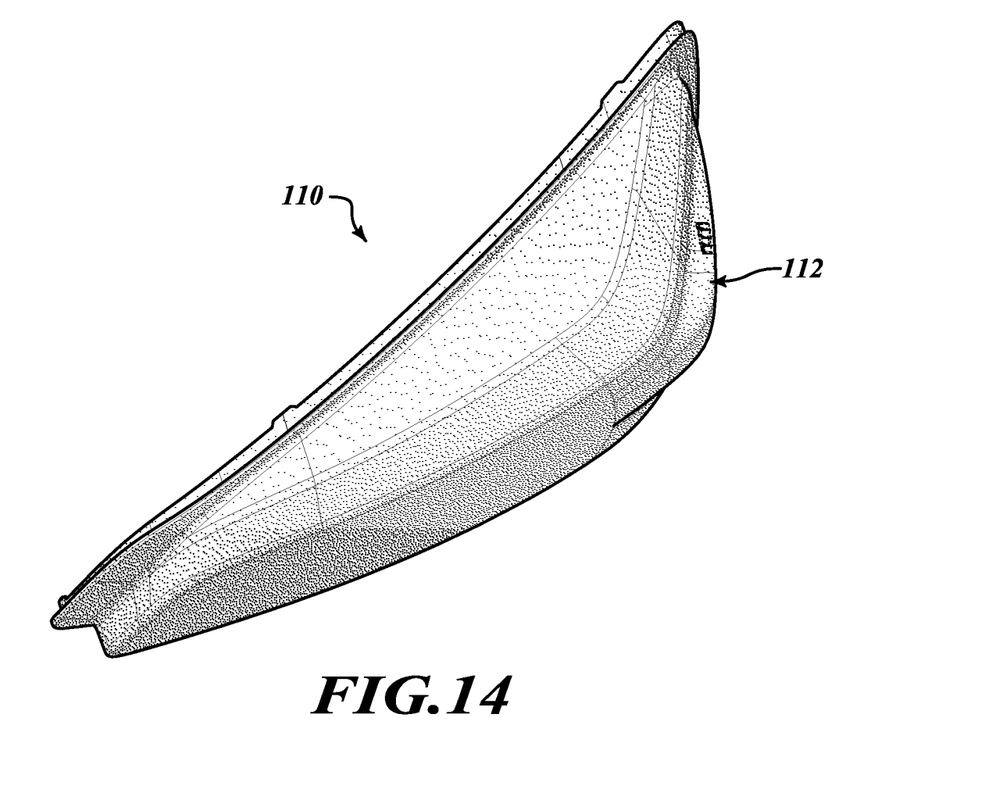
FIG. 14 illustrates a top view of the cover lens of the headlamp assembly of FIG. 1.

Each of the optical surfaces 114 is positioned, oriented, contoured, and otherwise configured such that refraction of light from the major filament 104b and/or propagating through the flutes 120 and entering the rear, inner surface of the cover lens 110 through the optical surfaces 114 and exiting a front, outer surface of the cover lens 110 is distributed and/or directed front-to-back and/or up-and-down with respect to the truck 100 to meet all fore-aft and/or vertical angle requirements for side-facing turn signals specified in FMVSS 108, including light intensity requirements thereof. For example, light from the major filament 104b and/or propagating through the flutes 120 and entering the optical surfaces 114a may be redirected by refraction forward or fore and/or upward, light from the major filament 104b and/or propagating through the flutes 120 and entering the optical surfaces 114b may be redirected by refraction rearward or aft, and light from the major filament 104b and/or propagating through the flutes 120 and entering the optical surfaces 114c may be redirected by refraction forward or fore and/or downward. FIG. 14 illustrates a top view of the cover lens 110 of the headlamp assembly 102.

Combinations of the various features of the light bulb 104, bezel 106, amber lens 108, and cover lens 110 described herein, and the refractive, reflective, transmissive, and other optical features thereof, are configured to fulfill functions as described herein, including side reflex refractor, side-facing turn signal, forward-facing turn signal, and side marker light functions, with exactly one single halogen bulb including exactly two filaments. Further, the combinations of the various features of the light bulb 104, bezel 106, amber lens 108, and cover lens 110 described herein, and the refractive, reflective, transmissive, and other optical features thereof, are configured to do so without incorporating any moving parts or LEDs.

For example, to fulfill the forward-facing turn signal functionality required by FMVSS 108, light from the minor filament 104a and/or the major filament 104b is reflected by the pillow reflectors 126 toward the curved optical surfaces 116 of the amber lens 108. Such light, and additional light directly from the minor filament 104a and/or the major filament 104b, propagates through the curved optical surfaces 116 of the amber lens 108, which increases a side-to-side spread angle, both inboard and outboard, of such light as described elsewhere herein, through the cover lens 110 (which is optically neutral to the propagation paths of this light), and outward in front of the truck 100. At the same time, the flutes 132 reduce reflectivity and/or absorb light to reduce glare. Such light from the major filament 104b alone may be sufficient to fulfill the forward-facing turn signal functionality required by FMVSS 108 without any light from the minor filament 104a.

As another example, to fulfill the side-facing turn signal functionality required by FMVSS 108, some of the light from the major filament 104b propagates through the cutaway portion 128 of the socket 124 of the bezel 106, through the flutes 120 in the amber lens 108, which distributes the light forward (fore) and rearward (aft) or front-to-back with respect to the truck 100, and through the cover lens 110 and the optical surfaces 114 thereof, which further redirect and distribute the light to meet all requirements for side-facing turn signals specified in FMVSS 108, including fore/aft and vertical angle requirements thereof. The optical surfaces 114 of the protrusion 112 of the cover lens 110 are positioned to receive, or are focused specifically on, light from the major filament 104b of the light bulb 104 as seen through the flutes 120, such as to improve the performance of the side-facing turn signal functionality provided by the headlamp assembly 102.

As another example, to fulfill the side marker light functionality required by FMVSS 108, some of the light from the minor filament 104a propagates through the cutaway portion 128 of the socket 124 of the bezel 106, through the flutes 120 in the amber lens 108, which distributes the light forward (fore) and rearward (aft) or front-to-back with respect to the truck 100, and through the cover lens 110 without propagating through the optical surfaces 114 thereof, such that the cover lens 110 is optically neutral to the propagation paths of this light, to meet at least some requirements for side marker lights specified in FMVSS 108, such as fore/aft requirements thereof. Additionally, some of the light from the minor filament 104a propagates through the cutaway portion 128 of the socket 124 of the bezel 106, through the optical surfaces 122 in the amber lens 108, which distributes the light upward and/or downward, or vertically, with respect to the truck 100, and through the cover lens 110 without propagating through the optical surfaces 114 thereof, such that the cover lens 110 is optically neutral to the propagation paths of this light, to meet at least some requirements for side marker lights specified in FMVSS 108, such as vertical angle requirements thereof.

The optical surfaces 114 of the protrusion 112 of the cover lens 110 are positioned and/or oriented to avoid receiving, or are focused away from, light from the minor filament 104a of the light bulb 104 as seen through the flutes 120 and/or the optical surfaces 122. Thus, the features described herein take advantage of the known and different locations of the minor filament 104a and the major filament 104b within the light bulb 104. Specifically, the features described herein allow the light from both filaments to pass through the flutes 120, to spread the light from both filaments, while only the light from the major filament 104b also propagates through the optical surfaces 114 of the cover lens 110. Thus, the known and different locations of the two filaments 104a and 104b allows selective use of the optical features of the amber lens 108 and the cover lens 110 depending on the desired optical outcomes.

As one additional example, to fulfill the side reflex refractor functionality required by FMVSS 108, light incoming to the truck 100, the headlamp assembly 102, and the amber lens 108 specifically, propagates through the cover lens 110 and to the side reflex refractor 118 of the amber lens 108, where it is reflected back in substantially the same direction from which it was received. That is, rays incident to the side reflex refractor 118 are coincident or substantially coincident with, and parallel to, rays reflected by the side reflex refractor 118. The reflected light propagates from the side reflex refractor 118 of the amber lens 108, through the cover lens 110, and back toward the original source of the light. The cover lens 110 is optically neutral to the propagation paths of this light.

The minor filament 104a and the major filament 104b may be powered and/or controlled independently of one another. Thus, a driver or operator of the truck 100 may actuate a turn signal, resulting in the major filament 104b blinking on and off, while the minor filament 104a remains on constantly. As described elsewhere herein, the minor filament 104a is typically less bright than the major filament 104b when the major filament 104b is on or illuminated. Every time light passes through either the amber lens 108 or the cover lens 110, between one and three percent, such as about two percent, of the energy of the light is converted to heat and lost.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A headlamp assembly, comprising:
an incandescent light bulb including two filaments;

a bezel;

an amber lens; and a cover lens;

wherein the light bulb, the bezel, the amber lens, and the cover lens are configured to provide forward-facing turn signal, side-facing turn signal, side marker light, and side reflex refractor functionality.

2. The headlamp assembly of claim 1 wherein the headlamp assembly is mounted in a medium-duty truck.

3. The headlamp assembly of claim 1 wherein the incandescent light bulb is a halogen light bulb.

4. The headlamp assembly of claim 1 wherein the light bulb, the bezel, the amber lens, and the cover lens are configured such that the headlamp assembly provides forward-facing turn signal, side-facing turn signal, side marker light, and side reflex refractor functionality in conformance with all requirements specified in Federal Motor Vehicle Safety Standard 108.

5. The headlamp assembly of claim 1 wherein the light bulb, the bezel, the amber lens, and the cover lens are configured such that the headlamp assembly provides a forward-facing turn signal that is visible 45° inboard and 85° outboard and that provides 75 square centimeters of projected illuminated area.

6. The headlamp assembly of claim 1 wherein the light bulb, the bezel, the amber lens, and the cover lens are configured such that the headlamp assembly provides a side-facing turn signal that is visible 70° aft.

7. The headlamp assembly of claim 1 wherein the light bulb, the bezel, the amber lens, and the cover lens are configured such that the headlamp assembly provides a side marker light that is visible 45° fore and 45° aft.

8. The headlamp assembly of claim 1 wherein the light bulb, the bezel, the amber lens, and the cover lens are configured such that the headlamp assembly provides a side reflex refractor that is functional at an angle of 20° aft.

9. A headlamp assembly, comprising:

an incandescent light bulb including two filaments, the two filaments including a minor filament and a major filament that is brighter than the minor filament;

an amber lens including first optical features that spread a first portion of light from the incandescent light bulb left-to-right, second optical features that spread a second portion of light from the incandescent light bulb front-to-back, third optical features that redirect a third portion of light from the incandescent light bulb vertically, and a side reflex refractor; and a cover lens including fourth optical features that spread a fourth portion of light from the incandescent light bulb front-to-back and fifth optical features that redirect a fifth portion of light from the incandescent light bulb vertically.

10. The headlamp assembly of claim 9 wherein the first optical features of the amber lens include a plurality of distinct curved optical surfaces formed in a rear surface of the amber lens, wherein each of the curved optical surfaces has a convex shape when viewed from behind the amber lens.

11. The headlamp assembly of claim 9 wherein the second optical features of the amber lens include a plurality of substantially vertical flutes, wherein each of the flutes includes a substantially vertically-oriented curved optical surface having a convex shape when viewed from behind the amber lens.

12. The headlamp assembly of claim 9 wherein the third optical features of the amber lens include a plurality of generally planar optical surfaces formed in a rear surface of the amber lens.

13. The headlamp assembly of claim 9 wherein the fourth optical features of the cover lens include a plurality of optical surfaces formed in a rear surface of the cover lens, wherein each of the optical surfaces has a generally convex shape when viewed from behind the cover lens.

14. The headlamp assembly of claim 9 wherein the fifth optical features of the cover lens include a plurality of optical surfaces formed in a rear surface of the cover lens, wherein each of the optical surfaces has a generally planar shape when viewed from behind the cover lens.

15. The headlamp assembly of claim 9, further comprising a bezel, wherein the bezel includes a plurality of reflective convex curved surfaces that are contoured to focus light from the major filament forward.

16. The headlamp assembly of claim 15, wherein the bezel further includes a cutaway portion that interrupts a generally spherical arrangement of the plurality of reflective convex curved surfaces.

17. A method of operating a headlamp assembly, comprising:

illuminating a major filament of an incandescent light bulb such that a first portion of light generated by the major filament propagates through and is spread inboard and outboard by interaction with first optical surfaces of an amber lens to provide forward-facing turn signal functionality and such that a second portion of light generated by the major filament propagates through and is spread fore and aft by interaction with second optical surfaces of the amber lens and propagates through and is redirected by interaction with optical surfaces of a cover lens to provide side-facing turn signal functionality; and illuminating a minor filament of the incandescent light bulb such that a first portion of light generated by the minor filament propagates through and is spread fore and aft by interaction with the second optical surfaces of the amber lens and does not propagate through and is not redirected by interaction with the optical surfaces of the cover lens, and such that a second portion of light generated by the minor filament propagates through and is distributed vertically by interaction with third optical surfaces of the amber lens and does not propagate through and is not redirected by interaction with the optical surfaces of the cover lens, to provide side marker light functionality.

18. The method of claim 17, wherein a third portion of light generated by the minor filament propagates through and is spread inboard and outboard by interaction with the first optical surfaces of the amber lens.

19. The method of claim 17 wherein the first portion of light generated by the major filament is reflected by a bezel of the headlamp assembly prior to propagating through the first optical surfaces of the amber lens.

20. The method of claim 17 wherein the second portion of light generated by the major filament propagates through a cutaway portion of a bezel of the headlamp assembly prior to propagating through the second optical surfaces of the amber lens, wherein the first portion of light generated by the minor filament propagates through the cutaway portion of the bezel prior to propagating through the second optical surfaces of the amber lens, and wherein the second portion of light generated by the minor filament propagates through the cutaway portion of the bezel prior to propagating through the third optical surfaces of the amber lens.

\* \* \* \* \*